(12) United States Patent
Werner et al.

(10) Patent No.: US 10,442,253 B2
(45) Date of Patent: Oct. 15, 2019

(54) TIRE PRESSURE MONITORING SYSTEM (TPMS) MODULE LOCALIZATION USING BLUETOOTH LOW ENERGY BEACONS

(71) Applicant: Infineon Technologies AG, Neubiberg (DE)

(72) Inventors: Maximilian Werner, Fischach (DE); Michael Kandler, Sauerlach (DE); Wolfgang Scheibenzuber, München (DE)

(73) Assignee: Infineon Technologies AG (DE)

( * ) Notice: Subject to any disclaimer, the term of this patent is extended or adjusted under 35 U.S.C. 154(b) by 0 days.

(21) Appl. No.: 15/877,704

(22) Filed: Jan. 23, 2018

(65) Prior Publication Data

US 2019/0230615 A1    Jul. 25, 2019

(51) Int. Cl.
| | |
|---|---|
| *B60C 23/00* | (2006.01) |
| *B60C 23/04* | (2006.01) |
| *H04B 17/318* | (2015.01) |
| *H04W 4/80* | (2018.01) |
| *B60C 23/02* | (2006.01) |

(52) U.S. Cl.
CPC .............. *B60C 23/00* (2013.01); *B60C 23/02* (2013.01); *B60C 23/04* (2013.01); *B60C 23/0408* (2013.01); *B60C 23/0422* (2013.01); *B60C 23/0433* (2013.01); *B60C 23/0447* (2013.01); *H04B 17/318* (2015.01); *H04W 4/80* (2018.02)

(58) Field of Classification Search
CPC ..... B60C 23/0408; B60C 23/00; B60C 23/02; B60C 23/04; B60C 23/0422; B60C 23/0433; B60C 23/0435; B60C 23/0437; B60C 23/0438; B60C 23/0442
See application file for complete search history.

(56) References Cited

U.S. PATENT DOCUMENTS

| | | | | |
|---|---|---|---|---|
| 7,181,189 B2* | 2/2007 | Hotta | .................. | B60C 23/0416 340/442 |
| 7,271,711 B2* | 9/2007 | Daiss | .................. | B60C 23/0416 340/442 |
| 7,411,487 B2* | 8/2008 | Takao | .................. | B60C 23/007 116/34 R |
| 7,574,293 B2* | 8/2009 | Vredevoogd | ....... | B60C 23/0416 340/442 |
| 7,716,976 B2* | 5/2010 | Lin | ..................... | B60C 23/0416 73/146.4 |

(Continued)

*Primary Examiner* — Devan A Sandiford
(74) *Attorney, Agent, or Firm* — Design IP

(57) ABSTRACT

A tire pressure monitoring system (TPMS) includes a plurality of beacon transmitters each provided at different locations and each configured to transmit a plurality of beacons; a first TPMS sensor module configured to receive the plurality of beacons from each of the plurality of beacon transmitters, measure a signal strength of each of the plurality of beacons from each of the plurality of beacon transmitters, and transmit a signal including a first signal strength value for each of the plurality of beacon transmitters, each first signal strength value being representative of the measured signal strength of one or more of the plurality of beacons from a corresponding beacon transmitter of the plurality of beacon transmitters; and a control unit configured to receive the signal and determine a location of the first TPMS sensor module based on the first signal strength value for each of the plurality of beacon transmitters.

19 Claims, 5 Drawing Sheets

(56) References Cited

U.S. PATENT DOCUMENTS

| | | | |
|---|---|---|---|
| 7,994,904 B2* | 8/2011 | Kim | B60C 23/0416 340/10.1 |
| 9,469,166 B2* | 10/2016 | McIntyre | B60C 23/007 |
| 9,539,867 B2* | 1/2017 | Okada | B60C 23/0416 |
| 9,950,577 B1* | 4/2018 | Marlett | B60C 23/0416 |
| 10,160,270 B2* | 12/2018 | Araya | B60C 23/04 |
| 10,257,730 B1* | 4/2019 | Van Wiemeersch | H04W 24/08 |
| 2003/0122660 A1* | 7/2003 | Kachouh | B60C 23/0408 340/442 |
| 2004/0217854 A1* | 11/2004 | Hirohama | B60C 23/0416 340/445 |
| 2005/0104722 A1* | 5/2005 | Tang | B60C 23/0408 340/445 |
| 2006/0132296 A1* | 6/2006 | Robson | B60C 23/0408 340/445 |
| 2007/0205883 A1* | 9/2007 | Mori | B60C 23/0416 340/447 |
| 2008/0127723 A1* | 6/2008 | Lin | B60C 23/0416 73/146.4 |
| 2008/0150712 A1* | 6/2008 | Cooprider | B60C 23/0408 340/447 |
| 2009/0015393 A1* | 1/2009 | Mori | B60C 23/0416 340/445 |
| 2009/0058626 A1* | 3/2009 | Watabe | B60C 23/0416 340/447 |
| 2009/0160632 A1* | 6/2009 | Mori | B60C 23/045 340/447 |
| 2009/0256695 A1* | 10/2009 | Bettecken | B60C 23/008 340/442 |
| 2010/0066522 A1* | 3/2010 | Ichikawa | B60C 23/007 340/442 |
| 2011/0304442 A1* | 12/2011 | Lickfelt | B60C 23/0418 340/10.33 |
| 2013/0069760 A1* | 3/2013 | Lickfelt | H04B 17/29 340/5.61 |
| 2013/0120127 A1* | 5/2013 | Sun | B60C 23/0437 340/447 |
| 2014/0188348 A1* | 7/2014 | Gautama | B60W 10/30 701/48 |
| 2014/0207329 A1* | 7/2014 | Juzswik | B60C 23/0416 701/32.7 |
| 2015/0285906 A1* | 10/2015 | Hooper | G01S 7/412 342/21 |
| 2016/0173737 A1* | 6/2016 | Cho | H04N 5/225 348/148 |
| 2017/0036499 A1* | 2/2017 | McIntyre | B60C 23/0462 |
| 2017/0151840 A1* | 6/2017 | Tsujita | B60C 23/0416 |
| 2017/0361807 A1* | 12/2017 | Dellock | B60R 25/016 |
| 2018/0229560 A1* | 8/2018 | DeCia | B60C 23/0416 |
| 2018/0361803 A1* | 12/2018 | Saburi | B60C 23/0416 |
| 2019/0084359 A1* | 3/2019 | Hassani | H04B 17/318 |
| 2019/0152277 A1* | 5/2019 | Hassani | B60C 23/0416 |

\* cited by examiner

| Identifier | A | B | C | D |
|---|---|---|---|---|
| Averaged Signal strength | 10 | 15 | 40 | 18 |

FIG 7

| TPMS ID | 1 | 1 | 1 | 1 | 2 | 2 | 2 | 2 | 3 | 3 | 3 | 3 | 4 | 4 | 4 | 4 |
|---|---|---|---|---|---|---|---|---|---|---|---|---|---|---|---|---|
| Beacon ID | A | B | C | D | A | B | C | D | A | B | C | D | A | B | C | D |
| Averaged Signal strength | 50 | 21 | 11 | 19 | 20 | 48 | 24 | 9 | 10 | 21 | 49 | 23 | 22 | 10 | 23 | 51 |

TIRE PRESSURE MONITORING SYSTEM (TPMS) MODULE LOCALIZATION USING BLUETOOTH LOW ENERGY BEACONS

FIELD

The present disclosure relates generally to a tire pressure monitoring system (TPMS) and, more particularly, to localizing TPMS sensor modules in a TPMS.

BACKGROUND

Tire Pressure Monitoring Systems (TPMS) play an important role in vehicle safety and emissions reduction. A majority of this market is served by direct tire pressure monitoring systems, in which each tire contains a TPMS sensor module. Thus, a battery powered sensor module is assembled in the inside of a tire to monitor a tire pressure thereof. The sensor module contains a pressure sensor, a microcontroller, an radio-frequency (RF) transmitter and a coin battery cell.

Principally, the sensor module measures the tire pressure and uses a unidirectional link to transmit the measurement data to a central unit in the vehicle. Since battery cannot be changed, sensor module lifetime is determined by battery lifetime. A major portion of the power consumption is generated by the RF transmission. Hence, it is an important task to reduce power consumption for RF transmission as much as possible.

The sensor module may also have a low-frequency (LF) receiver, which is used to configure the sensor module after mounting sensor module to the tire in the car production or in a repair garage (e.g., in case of replacement modules or firmware update for maintenance of sensor modules which are already in use). Typically, the downlink communication from the module to the car is implemented via the RF transmitter at 315 or 434 MHz, whereas the uplink communication to the module is implemented via the LF receiver at 125 kHz. Thus, two communication devices with two communication channels are used.

In order to properly assess each tire, a vehicle must be able to localize each TPMS sensor module, meaning it must be able to know which module is located at which tire position (e.g., front left, rear right, etc.). Today, the most cost efficient and also most used solution for localizing a TPMS sensor module is using a correlation of two types of data.

The first type of data is an angle of the TPMS module during rotation. The TPMS module is able to either transmit data at a fixed angle during rotation or, on the other side, at least inform a TPMS electronic control unit (ECU) at which time it has been at which rotational angle related to the time of the RF transmission. With these two information, a phase of the TPMS sensor module and a time of that phase, the ECU can determine the angle of any of the four TPMS sensor modules during rotation.

The second type of data is anti-lock braking system (ABS) data. Typically, an ABS ECU puts the current ABS counter values, counting from [0 . . . a] during each rotation, on a Controller Area Network (CAN) bus. The TPMS ECU can then correlate the two types of data in order to determine which TPMS module is located at which tire position.

This solution has some disadvantages. One disadvantage is that the TPMS sensor module must transmit several times during localization process. Thus, it has a negative impact on the charge consumption of the TPMS module, degrading the lifetime of the sensor module. Another disadvantage is that the TPMS ECU must have access to the CAN bus and must also run a rather complex algorithm and provide a big buffer for the data for correlation. A final disadvantage is that some ABS systems don't offer these counter values, but rather a value only corresponding to wheel speed, which cannot be used for this localizing approach. Thus, not all vehicles can use this localizing approach.

SUMMARY

A device, system, and methods for localizing tire pressure monitoring system (TPMS) modules in a TPMS are provided.

According to one or more embodiments, a TPMS sensor module includes a pressure sensor configured to measure an internal air pressure of a tire; a receiver configured to receive a first plurality of beacons from a first beacon origin and measure a signal strength of each of the first plurality of beacons; a microcontroller unit electrically connected to the receiver; and a transmitter electrically connected to the microcontroller unit and configured to transmit a signal including a first signal strength value representative of the measured signal strength of one or more of the first plurality of beacons.

According to one or more embodiments, a TPMS includes a plurality of beacon transmitters each provided at a different location and each configured to transmit a plurality of beacons; a TPMS sensor module configured to receive the plurality of beacons from each of the plurality of beacon transmitters, measure a signal strength of each of the plurality of beacons from each of the plurality of beacon transmitters, and transmit a signal including a signal strength value for each of the plurality of beacon transmitters, each signal strength value being representative of the measured signal strength of one or more of the plurality of beacons from a corresponding beacon transmitter of the plurality of beacon transmitters; and a control unit configured to receive the signal and determine a location of the TPMS sensor module based on the signal strength value for each of the plurality of beacon transmitters.

According to another one or more embodiments, a TPMS sensor module localizing method includes receiving a first plurality of beacons from a first beacon origin; measuring a signal strength of each of the first plurality of beacons; and transmitting a signal including a first signal strength value representative of the measured signal strength of one or more of the first plurality of beacons.

According to another one or more embodiments, a TPMS sensor module localizing method includes transmitting a plurality of beacons from a plurality of beacon transmitters that are each provided at a different location; receiving, by a TPMS sensor module, to the plurality of beacons from each of the plurality of beacon transmitter; measuring, by the TPMS sensor module, a signal strength of each of the plurality of beacons from each of the plurality of beacon transmitters; transmitting, by the TPMS sensor module, a signal including a signal strength value for each of the plurality of beacon transmitters, each signal strength value being representative of the measured signal strength of one or more of the plurality of beacons from a corresponding beacon transmitter of the plurality of beacon transmitters; and receiving, by a control unit, the signal; and determining, by the control unit, a location of the TPMS sensor module based on the signal strength value for each of the plurality of beacon transmitters.

BRIEF DESCRIPTION OF THE DRAWINGS

Embodiments are described herein making reference to the appended drawings.

FIG. 7 shows a table generated by an ECU according to one or more embodiments based on an example distribution of the BLE beacons transmitters and TPMS modules shown in FIG. 2.

DETAILED DESCRIPTION

Figure 1:
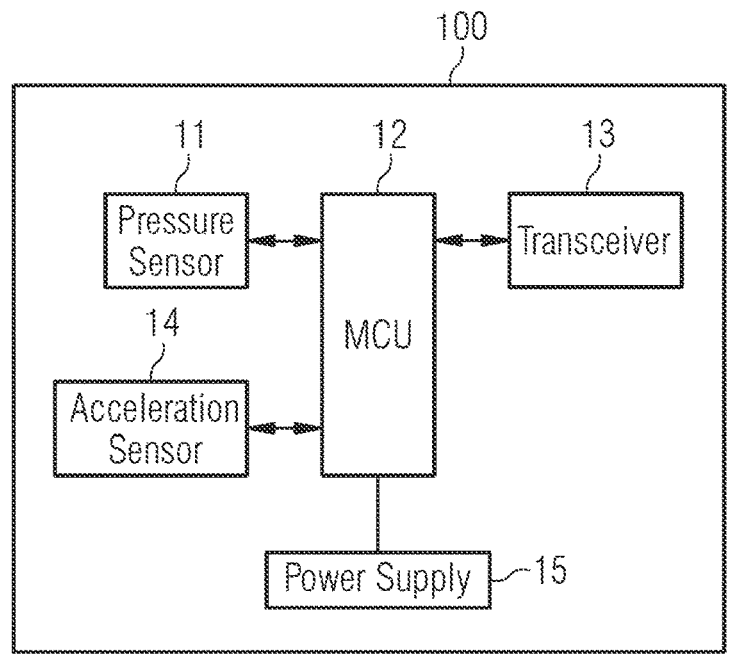
FIG. 1 illustrates a monolithic TPMS sensor module according to one or more embodiments.

In the following, a plurality of details are set forth to provide a more thorough explanation of the exemplary embodiments. However, it will be apparent to those skilled in the art that embodiments may be practiced without these specific details. In other instances, well-known structures and devices are shown in block diagram form or in a schematic view rather than in detail in order to avoid obscuring the embodiments. In addition, features of the different embodiments described hereinafter may be combined with each other, unless specifically noted otherwise.

Further, equivalent or like elements or elements with equivalent or like functionality are denoted in the following description with equivalent or like reference numerals. As the same or functionally equivalent elements are given the same reference numbers in the figures, a repeated description for elements provided with the same reference numbers may be omitted. Hence, descriptions provided for elements having the same or like reference numbers are mutually exchangeable.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

In embodiments described herein or shown in the drawings, any direct electrical connection or coupling, i.e., any connection or coupling without additional intervening elements, may also be implemented by an indirect connection or coupling, i.e., a connection or coupling with one or more additional intervening elements, or vice versa, as long as the general purpose of the connection or coupling, for example, to transmit a certain kind of signal or to transmit a certain kind of information, is essentially maintained. Features from different embodiments may be combined to form further embodiments. For example, variations or modifications described with respect to one of the embodiments may also be applicable to other embodiments unless noted to the contrary.

Embodiments relate to sensors and sensor systems, and to obtaining information about sensors and sensor systems. A sensor may refer to a component which converts a physical quantity to be measured to an electric signal, for example, a current signal or a voltage signal. The physical quantity may for example comprise a magnetic field (e.g., the Earth's magnetic field), an electric field, a pressure, an acceleration, a temperature, a force, a current, or a voltage, but is not limited thereto. A sensor device, as described herein, may be an angle sensor, a linear position sensor, a speed sensor, motion sensor, a pressure sensor, acceleration sensor, temperature sensor, and the like.

A magnetic field sensor, for example, includes one or more magnetic field sensor elements that measure one or more characteristics of a magnetic field (e.g., an amount of magnetic field flux density, a field strength, a field angle, a field direction, a field orientation, etc.) corresponding to detecting and/or measuring the magnetic field pattern of an element that generates the magnetic field (e.g., a magnet, a current-carrying conductor (e.g. a wire), the Earth, or other magnetic field source).

A sensor circuit may be referred to as a signal processing circuit and/or a signal conditioning circuit that receives the signal (i.e., sensor signal) from the pressure field sensor element in the form of raw measurement data. The sensor circuit may include an analog-to-digital converter (ADC) that converts the analog signal from the pressure sensor to a digital signal. The sensor circuit may also include a digital signal processor (DSP) that performs some processing on the digital signal (e.g., to prepare tire pressure information for transmission). Therefore, the sensor package comprises a circuit which conditions and amplifies the small signal of the pressure sensor via signal processing and/or conditioning.

Signal conditioning, as used herein, refers to manipulating an analog signal in such a way that the signal meets the requirements of a next stage for further processing. Signal conditioning may include converting from analog to digital (e.g., via an analog-to-digital converter), amplification, filtering, converting, biasing, range matching, isolation and any other processes required to make a sensor output suitable for processing after conditioning.

According to one or more embodiments, a pressure sensor and a sensor circuit are both accommodated (i.e., integrated) in the same chip package (e.g., a plastic encapsulated package, such as leaded package or leadless package, or a surface mounted device (SMD)-package). This chip package is also referred to as sensor package. The sensor package may be combined with other components to form a sensor module, sensor device, or the like.

A sensor device, as used herein, may refer to a device which includes a sensor and sensor circuit as described above. A sensor device may be integrated on a single semiconductor die (e.g., silicon die or chip), although, in other embodiments, a plurality of dies may be used for implementing a sensor device. Thus, the sensor and the sensor circuit are disposed on either the same semiconductor die or on multiple dies in the same package. For example, the sensor might be on one die and the sensor circuit on another die such that they are electrically connected to each other within the package. In this case, the dies may be comprised of the same or different semiconductor materials, such as GaAs and Si, or the sensor might be sputtered to a ceramic or glass platelet, which is not a semiconductor.

FIG. 1 illustrates a monolithic TPMS sensor module 100 according to one or more embodiments. The TPMS sensor module 100 is a direct TPMS sensor mounted inside a tire. A pressure sensor 11 can be incorporated as part of a typical semiconductor technology, and may be a microelectromechanical systems (MEMS) pressure sensor 11. Therefore, the pressure sensor 11 can enable the TPMS sensor 100, which includes the pressure sensor 11, a microcontroller unit (MCU) 12, and a transceiver 13, to aid in monitoring tire pressure. The pressure sensor 11 is electrically connected to the MCU 12 and configured to measure the internal air pressure of a tire. The TPMS sensor module 100 may also include an acceleration sensor 14 electrically connected to the MCU 12 and configured to detect and/or measure an acceleration of the tire (e.g., for detecting a motion of a vehicle). A power supply 15 (e.g., a battery cell) is further provided to supply power to the TPMS sensor 100 and its components.

The MCU 12 receives tire pressure information in the form of measurement values from the pressure sensor 11, and processes the information. The MCU 12 may store the tire pressure information and/or prepare the tire pressure information by the transceiver 13. The MCU 12 may further receive acceleration information from the acceleration sensor 14.

The transceiver 13 may be configured for bidirectional communication such that it both receives information (e.g., configuration information, control information, acknowledgement information) and transmits information (e.g., tire pressure information, magnetic field information, etc.). For example, the transceiver 13 may be a Bluetooth transceiver that may use Bluetooth low energy (BLE) signals for communication. The transceiver 13 may be configured to receive BLE beacons from BLE beacon transmitters and may further be configured to communicate with a vehicle electronic control unit (ECU), a setting tool, a diagnostic and testing tool, or the like. However, it will be appreciated that other types of transceivers may be used.

The MCU 12, is configured to receive signals from one or more components of the TPMS sensor module 100 (e.g., sensor signals from the pressure sensor or the acceleration sensor), process the received signals and control the components via control signals. The MCU 12 may further include one or more memory devices or be electrically connected to one or more memory devices provided in the TPMS sensor module 100.

The transceiver 13 is electrically connected to the MCU 12 and is configured to transmit a signal to the vehicle ECU, the setting tool, the diagnostic and testing tool, or mobile device. The transceiver 13 may transmit a signal (e.g., data and/or feedback information) to the vehicle ECU, the setting tool, or the diagnostic and testing tool in response to the transceiver 13 receiving data in the form of information, acknowledgement, or a command from the vehicle ECU, the setting tool, or the diagnostic and testing tool.

While not shown in FIG. 1, the TPMS sensor module 100 may further include a temperature sensor electrically connected to the MCU 12 and configured to measure the internal temperature of the tire, and an acceleration sensor electrically connected to the MCU 12 and configured to measure the acceleration of the tire. The acceleration sensor 14 may also be implemented by a magnetic sensor.

While the TPMS sensor module 100 is illustrated as a monolithic device (i.e., single die integration), it will be understood that one or more components (e.g., the transceiver 13) may be provided on a separate die inside the integrated circuit package of the TPMS sensor module 100.

Figure 2:
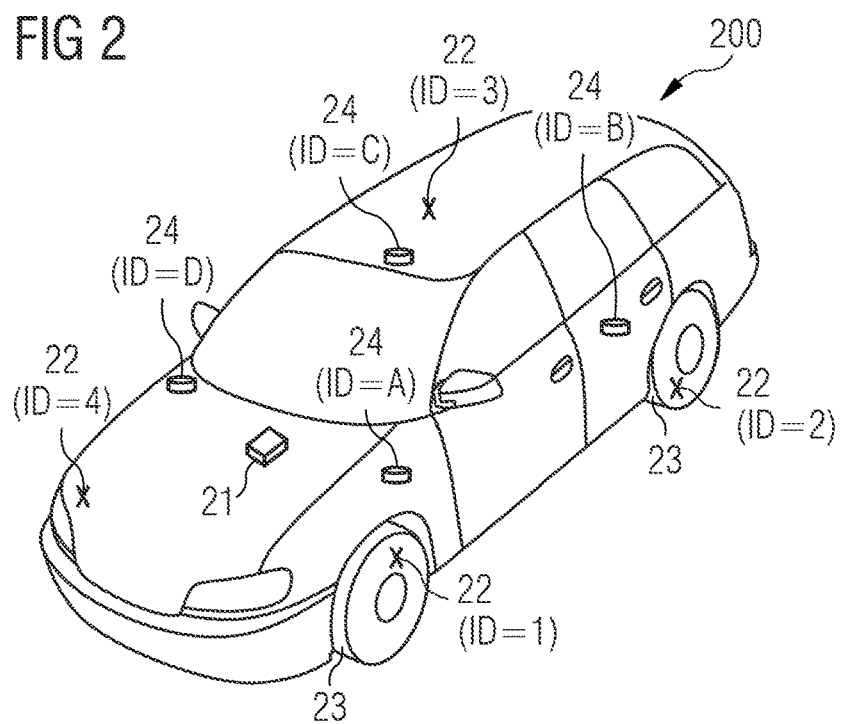
FIG. 2 illustrates a TPMS provided in a vehicle according to one or more embodiments.

FIG. 2 illustrates a TPMS provided in a vehicle 200 according to one or more embodiments. As shown in FIG. 2, the TPMS includes an ECU 21 that includes a Bluetooth transceiver, TPMS modules 22 provided inside each tire 23 of the vehicle 200 and configured to communicate with the ECU 21, and BLE beacon transmitters 24 distributed at various locations in the vehicle 200. It will be appreciated that the number and locations of the BLE beacon transmitters 24 are not limited to by this example so long as there is enough variation to adequately localize each of the TPMS modules 22.

Each TPMS module 22 has a similar configuration described in FIG. 1. In addition, each TPMS module 22 may have an identifier (ID) that uniquely corresponds thereto (e.g., ID 1, 2, 3, and 4). In this way the ECU 21 may be able to distinguish signals transmitted from various TPMS modules 22, identify the TPMS module 22 from which a signal originates, and determine a localization thereof. The ECU 21 may further store and/or register a location of each TPMS module 22 using the IDs thereof.

The BLE beacon transmitters 24 are distributed in the vehicle 200 at suitable positions and transmit their IDs (e.g., ID A, B, C, and D) periodically. Each TPMS module 22, using BLE, can receive BLE beacons from each of the BLE beacon transmitters 24, and measure a signal strength of each received BLE beacon. Each TPMS module 22 may report (i.e., transmit) the measured signal strength of each received BLE beacon to the ECU 21 in the vehicle 200, and the ECU 21 may use this information for localizing each TPMS module 22.

As will be described in further detail, a signal strength value representative of the measured signal strength may be reported by an TPMS module 22 to the ECU 21. A signal strength value representative of the measured signal strength includes instances where a TPMS module 22 transmits individual signal strength measurements or transmits an average signal strength value that is calculated from measurements of one or more beacons from a same beacon origin (i.e., same BLE beacon transmitter 24). An average signal strength value may be calculated and transmitted for each BLE beacon transmitter 24 based on beacons transmitted therefrom.

Figure 3A:
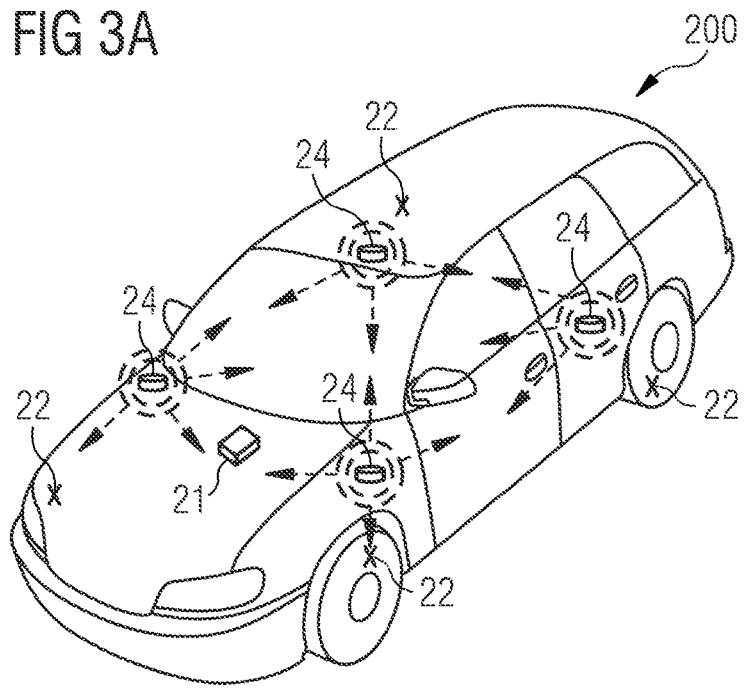
FIGS. 3A-3C show schematic diagrams illustrating a TMPS module localization process according to one or more embodiments.
Figure 3B:
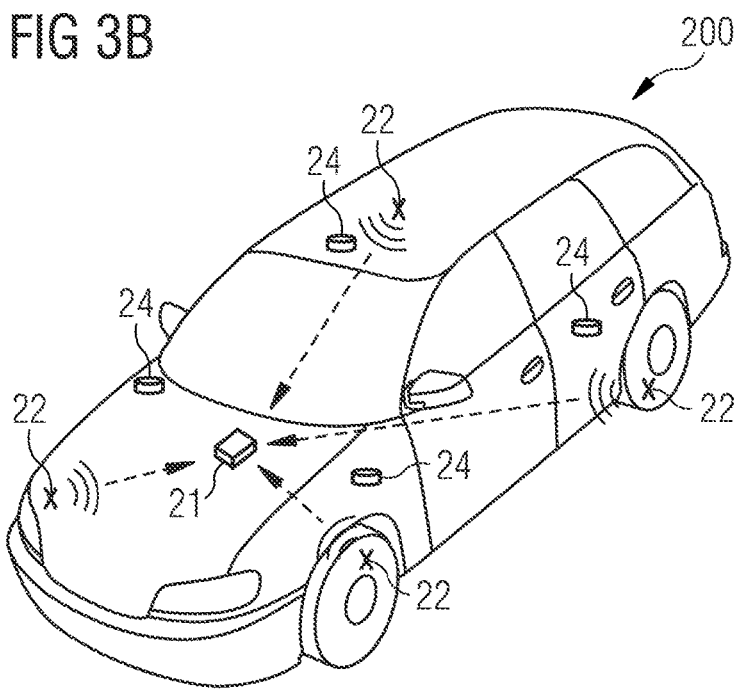
Figure 3C:
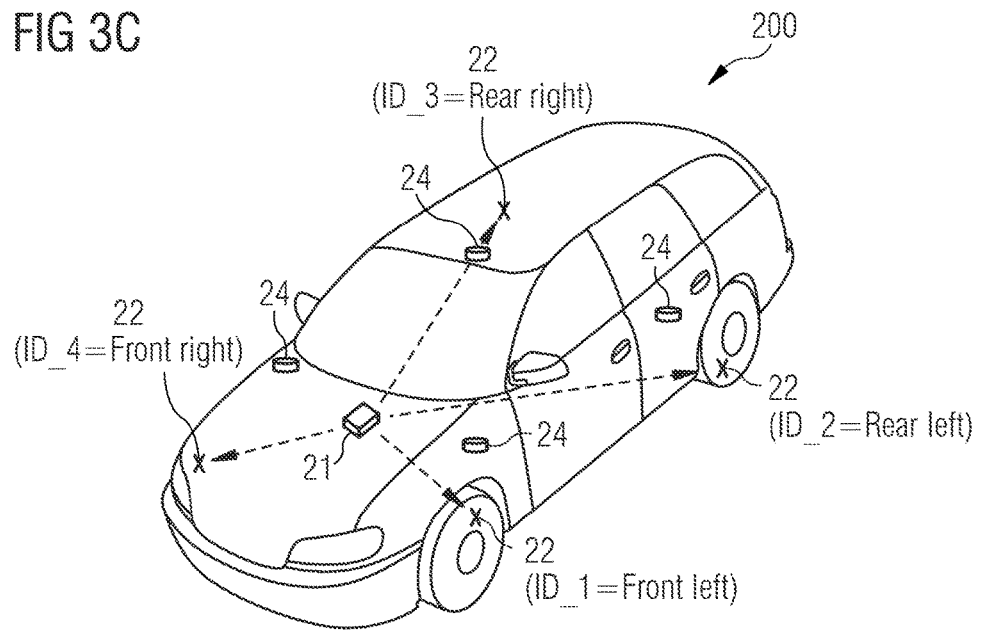

FIGS. 3A-3C illustrate a TMPS module localization process according to one or more embodiments. In particular, as shown in FIG. 3A, BLE beacon transmitters 24 transmit beacons that include the ID of its corresponding BLE beacon transmitter 24. Each BLE beacon is transmitted in the form of a omnidirectional broadcast such that each TPMS module 22 may receive it. Due to the attenuation of each BLE beacon as it travels through the vehicle 300, the TPMS module 22 closest to the corresponding BLE beacon transmitter 24 will measure a higher signal strength than a TPMS module 22 that is further away from the corresponding BLE beacon transmitter 24. It may even be possible that a TPMS module 22 may not receive any BLE beacons from one or more of the BLE beacon transmitters 24 due to distance and attenuation.

Each TPMS module 22 may further be configured to record a time of receipt (e.g., a time stamp) of each BLE beacon along with the corresponding ID of the BLE beacon transmitter 24. The time stamp information may be used to track when a BLE beacon was received and may be used by the ECU 21 to determine if a BLE beacon may not have been received by a TPMS module 22 in comparison to other TPMS modules 22 that may have received a BLE beacon within a same time window. A time window may be a period of time in which a same BLE beacon is expected to be received by multiple TPMS modules 22. An absence of a BLE beacon by one or more TPMS modules 22 may be used by the ECU 21 to determine a lack of proximity to a corresponding BLE beacon transmitter 24.

FIG. 3B shows that each TPMS module 22 transmits a signal to the ECU 21. Each signal includes a signal strength value representative of the measured signal strength for one or more BLE beacons from a same BLE beacon transmitter 24, and may include a signal strength value corresponding to each BLE beacon transmitter 24. Each signal may further include the ID(s) of the BLE beacon(s), and the ID of the TPMS module 22. The ECU 21 may be preconfigured with knowledge of the IDs and locations of each BLE beacon transmitter 24 such that a correlation of location can be extended to each TPMS module 22 based on the received signals at the ECU 21.

A signal strength value representative of the measured signal strength of one or more BLE beacons includes instances where the TPMS module 22 transmits signal strength measurements or transmits an average signal strength value that is calculated from measurements of one or more beacons from a same beacon origin (i.e., same beacon transmitter 24). An average signal strength value may be calculated and transmitted for each BLE beacon transmitter 24 based on beacons transmitted therefrom.

For example, each TPMS module 22 may measure a signal strength of a BLE beacon from a BLE beacon transmitter 24, and transmit the signal strength measurement in response to receiving the BLE beacon. The TPMS sensor module 22 may convert the raw signal strength measurement into a digital value before transmitting the information. However, transmitting a signal each time a BLE beacon is received from one of the BLE beacon transmitter 24 may place a strain on power consumption.

Alternatively, each TPMS module 22 may transmit a signal once a BLE beacon is received from each of the BLE beacon transmitters 24 or after a predetermined time period has lapsed, the signal including the signal strength measurement for each BLE beacon transmitter 24. This may aid in reducing the number of transmissions and conserve power consumption.

In the case where individual signal strength measurements (i.e., non-averaged values) are transmitted to the ECU 21, the ECU 21 may be configured to receive the individual signal strength measurements, and calculate an average signal strength value for each BLE beacon transmitter 24-TPMS module 22 pair using the IDs for the BLE beacon transmitter 24 and TPMS module 22. For example, for the TPMS module 22 with ID=1, the ECU 21 may calculate an average signal strength value for each BLE beacon transmitter 24 (IDs A, B, C, D) based on signal strength values reported by the TPMS module 22 with ID=1 for each of the BLE beacon transmitters 24.

Alternatively, the TPMS module 22 may measure a signal strength of one or more beacons from same BLE beacon transmitter 24. The measurements of multiple beacons from one BLE beacon transmitter 24 occurs serially over time. The TPMS module 22 may convert each measurement into a digital value and store the digital values in memory to use in calculating one or more average signal strength values of that BLE beacon transmitter 24. The TPMS module 22 may calculate the average signal strength value each time a BLE beacon from that BLE beacon transmitter 24 is received and store and/or transmit the (updated) average signal strength value. Thus, the average signal strength value may be updated each time a beacon is received from a same BLE beacon transmitter 24. Alternative, the average signal strength value may be calculated after a predetermined number of beacons from a same BLE beacon transmitter 24 are received or after a predetermined time period has lapsed, and may transmit the average signal strength value once calculated. In addition, the signal may include the average signal strength value for each of the BLE beacon transmitters 24.

FIG. 3C shows that the ECU 21 receives signals from each of the TPMS modules 22. Based on the received signal strength values, BLE beacon IDs, and TMPS module IDs received from the TPMS network, the ECU 21 may determine the position (i.e., location of each TPMS module). The ECU 21 may also receive time stamps as discussed above. By localizing each TPMS module 22, the ECU 21 may monitor the tire pressure of each tire (or other information transmitted by the TPMS module 22) based on location of the corresponding TPMS module 22 and convey one or more types of information to a user.

Upon localizing each of the TPMS modules 22, the ECU may be configured to send location information to each TPMS module 22 indicating its location, or may send a request for tire pressure information. In response to the request, each TPMS module 22 may enter a drive state and periodically send tire pressure information according to a preset time interval. Additionally or alternatively, each TPMS module 22 may enter the drive state at the expiration of an early drive state.

Thus, power saving in each TPMS module 22 may be realized, since each TPMS module 22 does not have to transmit data as often as conventional modules. Instead, each TPMS module 22 only has to enable the receiver (i.e., the transceiver) periodically for a limited period of time after motion detection and listen to incoming BLE beacons, which does not consume as much energy as transmitting angle position data with the same interval.

In addition, the ECU 21 may be simplified because no access to the ABS buffer has to be implemented and that data also does not have to be buffered anymore.

Furthermore, an increase of precision and localization speed may be realized because the localization algorithm is no longer dependent on the acceleration signal, and thus not sensitive to vibration noise.

The BLE beacon transmitters 24 can be implemented to transmit BLE beacons either only when the vehicle is moving, or periodically (e.g., every one second) regardless of vehicle motion (e.g., parked or driving). Also, the ECU 21 may be configured to control each of the beacon transmitters 24, or the BLE beacon transmitters 24 may be configured to operate completely autonomously. The benefit of centrally controlled BLE beacon transmitters could be the occurrence of less collisions and faster localization. The transmission interval may be in the range of seconds, for example, every one second.

Figure 4:
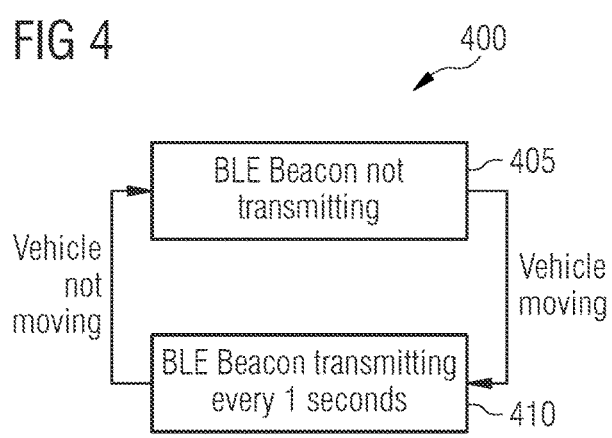
FIG. 4 shows a flow diagram of a BLE beacon transmission method according to one or more embodiments.

FIG. 4 shows a flow diagram of a BLE beacon transmission method 400 according to one or more embodiments. In particular, vehicle motion is configured to be detected. While the vehicle is not moving, BLE beacons are not transmitted (operation 405). While the vehicle is moving, BLE beacons are transmitted at a transmission interval (e.g., every one second) (operation 410). The application of the TPMS module 22 can distinguish between driving and parking by using a means of motion detection either integrated in the TPMS integrated circuit (IC) or connected to it. For example, the means of motion detection may be an acceleration sensor configured to detect radial acceleration that occurs upon rotation of the wheel, or a magnetic sensor configured to detect a change in a measured magnetic field, such as the Earth's magnetic field, indicative of a rotation of the tire.

Figures 5, 6:
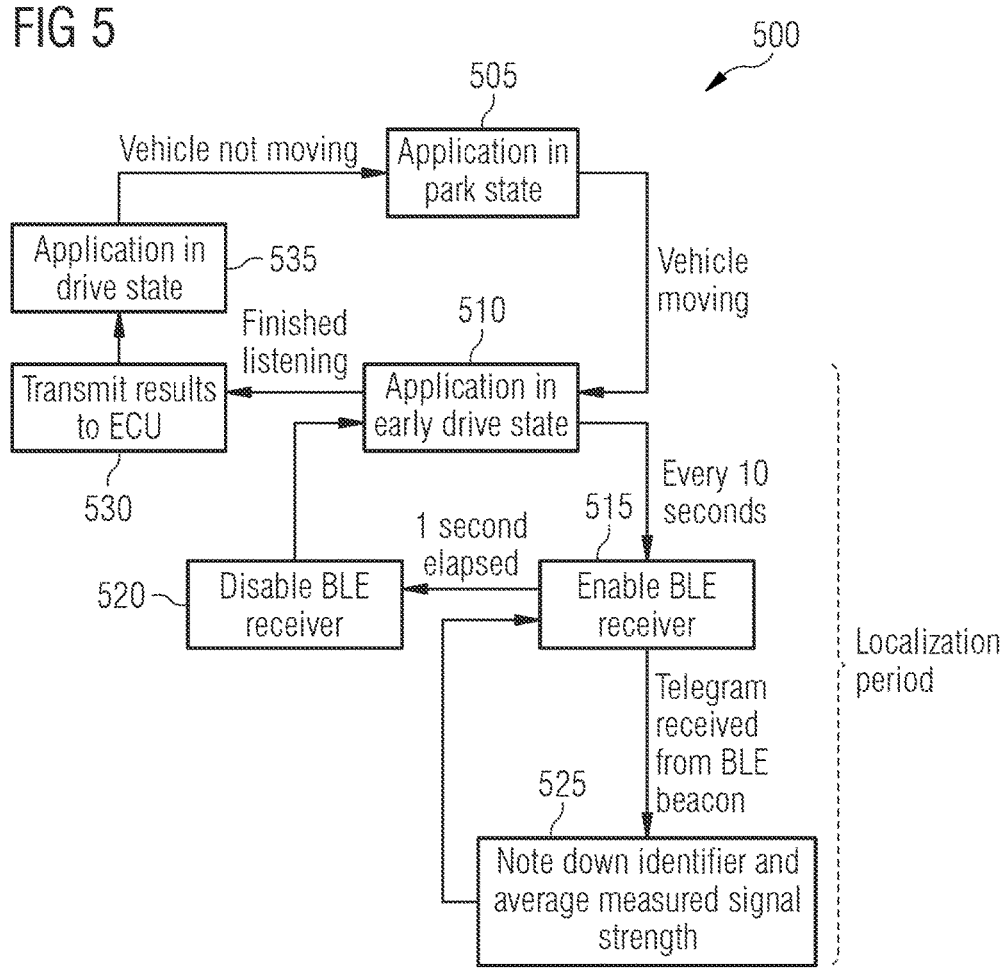
FIG. 5 shows a flow diagram of a TPMS module localization method according to one or more embodiments.
FIG. 6 shows a table of received identifiers and averaged signal strengths for each of the BLE beacon transmitters.

FIG. 5 shows a flow diagram of a TPMS module localization method 500 according to one or more embodiments.

In particular, motion is not detected, and a TPMS module determines that the vehicle is in a park state (operation 505). When the vehicle starts driving, the application of each TPMS module 22 will change its state from park state to early drive state (operation 510) which may continue for a preset early drive duration (e.g., 10 minutes). The early drive state includes operations 515, 520 and 525, which continue in a loop for the preset early drive duration.

During the early drive state, each TPMS module 22 periodically (e.g., every 10 seconds) enables its BLE receiver/transceiver and listens for incoming beacons from the BLE beacon transmitters 24 (operation 515). After a short listening duration (e.g., 1 second), each TPMS module 22 disables its BLE receiver/transceiver (operation 520). However, while its BLE receiver/transceiver is enabled, each TPMS module 22 records information from any BLE frame (i.e., beacon) it receives (operation 525). This may include the ID of the corresponding BLE beacon transmitter 24 and the measured signal strength of the BLE beacon.

When another BLE frame (i.e., beacon) from the same BLE beacon transmitter 24 arrives, the measured signal strength may be averaged with previous values. This is done for a limited time, for example, 10 minutes. Alternatively, this can be done until the signal strength of each BLE beacon transmitter 24 has been measured a certain number of times.

The transmission of the measured and/or averaged signal strengths by the TPMS module 22 may happen either directly after each reception of a BLE beacon transmitter's frame, collectively from time to time, or even once at the end of a localization time period (e.g., 10 minutes). The transmission of all averaged measured signal strengths at the end of localization might be preferred due to its best energy efficiency, while regular transmissions of current averaged measured signal strengths from time to time during the localization might be preferred for faster localization and sooner user feedback. In the example shown in FIG. 5, the TPMS module 22 is configured to transmit the average signal strength of each BLE beacon transmitter at the end of the localization time period (i.e., at the end of the early drive state) (operation 530). The TPMS module 22 may then enter into a drive state in which the TPMS module 22 transmits tire pressure information on a periodic basis until the TPMS module 22 determines the vehicle enters a park state (operation 535).

When the application in a TPMS module 22 has finished the process of receiving and saving the measured signal strengths of each available BLE beacon transmitter 24, it will have a table of identifiers and according measured or average signal strengths, for example, as shown in FIG. 6. In particular, FIG. 6 is a table of received identifiers and averaged signal strengths for each of the BLE beacon transmitters (ID 1, 2, 3, and 4).

This table is generated by each TPMS module 22 with their respective measured average signal strength values for each of the BLE beacon transmitters (ID 1, 2, 3, and 4). Each table is transmitted by its TPMS module 22 to the ECU 21 via BLE. After transmission of the table, the application of each TPMS module 22 may change its state to drive state and may discontinue the localization for this driving period of the vehicle.

The ECU 21 may be configured to permanently listen for incoming TPMS telegrams (i.e., signals) from TPMS modules 22. Although it could theoretically also receive the BLE beacons from the BLE beacon transmitters 24, those are ignored because they are not relevant to the ECU 21. For localization, the only relevant information are the telegrams coming from the TPMS modules 22.

When the TPMS modules 22 have finished the early drive state, the ECU 21 will receive the measured and/or averaged signal strengths for each BLE beacon transmitters 24 (i.e., for each ID) from each TPMS module 22. This may result in a 3*(n*m) table, generated by the ECU 21, where n is the number of BLE beacon transmitters 24 and m is the number of TPMS modules 22.

When all the tables from each TPMS module 22 have been received, the ECU 21 will make a determination for the localization. Since the position of each BLE beacon transmitter 24 is known to the ECU 21, the TPMS module 22 reporting the highest signal strength of a certain BLE beacon transmitter 24 must be located closest to that BLE beacon transmitter 24, and so on.

FIG. 7 is a table generated by the ECU 21 according to one or more embodiments based on the example distribution of the BLE beacons transmitters 24 and TPMS modules 22 shown in FIG. 2. In particular, the table shown in FIG. 7 is an example collection of received tables from the TPMS modules 22 with data from the TPMS modules 22 for each BLE beacon transmitter 24. The highest average signal strength for each for a corresponding TPMS module 22 and BLE beacon transmitter 24 is in bold, indicating a location of the TPMS module 22. In the example, the ECU 21 may determine that TPMS module 22 with ID=1 is closest to BLE beacon transmitter 24 with ID=A, which is located in the front left region of the vehicle. This means also the TPMS module 22 with ID=1 must also be in the front left region of the vehicle (i.e., at the front left tire). This is done accordingly for each TPMS module ID such that the location of each TPMS module 22 is determined and distinguished from the others.

It will be appreciated that the amount and distribution of BLE beacons is only exemplary and could be different, for example more/less beacons distributed somewhere else in the vehicle.

In addition, in the case where individual signal strength measurements (i.e., non-averaged values) are transmitted by the TPMS modules 22 (IDs 1, 2, 3, and 4) to the ECU 21, the ECU 21 may be configured to receive the individual signal strength measurements, and generate the table shown in FIG. 7 by calculating an average signal strength value for each BLE beacon transmitter 24-TPMS module 22 pair using the IDs for the BLE beacon transmitter 24 and TPMS module 22. For example, for the TPMS module 22 with ID=1, the ECU 21 may calculate an average signal strength value for each BLE beacon transmitter 24 (IDs A, B, C, D) based on signal strength values reported by the TPMS module 22 with ID=1 for each of the BLE beacon transmitters 24.

Based on the table, the ECU 21 can perform an analysis (e.g., a comparison) of average signal strength values for each TPMS module 22, and determine a location thereof.

In view of the above, a TPMS sensor module may include a pressure sensor configured to measure an internal air pressure of a tire; a receiver configured to receive a first plurality of beacons from a first beacon origin and measure a signal strength of each of the first plurality of beacons; a microcontroller unit electrically connected to the receiver; and a transmitter electrically connected to the microcontroller unit and configured to transmit a signal including a first signal strength value representative of the measured signal strength of one or more of the first plurality of beacons.

A signal strength value representative of the measured signal strength of one or more of the first plurality of beacons includes instances where the sensor module transmits direct (raw) signal strength measurements or transmits an average signal strength value that is calculated from measurements of the current and any previous beacons received from a same beacon origin (i.e., same beacon transmitter) during a localization time period.

The microcontroller unit may be configured to calculate a first average signal strength of the first plurality of beacons based on the measured signal strength of each of the first plurality of beacons, and the transmitter may be configured to transmit the signal, where the first average signal strength is provided as the first signal strength value representative of the measured signal strength of one or more of the first plurality of beacons.

Each of the first plurality of beacons may include a first origin identifier corresponding to the first beacon origin, and the transmitter may be configured to transmit the signal including the first origin identifier and the first signal strength value.

The TPMS sensor may have a TPMS identifier, and the transmitter may be configured to transmit the TPMS identifier in the signal.

The receiver and the transmitter may be integrated in a Bluetooth transceiver, and the first plurality of beacons may be Bluetooth low energy (BLE) beacons.

The receiver may be configured to receive a second plurality of beacons from a second beacon origin and measure a signal strength of each of the second plurality of beacons, and the transmitter may be configured to transmit the signal including the first signal strength value and a second signal strength value representative of the measured signal strength of one or more of the second plurality of beacons.

The microcontroller unit may be configured to calculate a first average signal strength of the first plurality of beacons based on the measured signal strength of each of the first plurality of beacons, the microcontroller unit may be configured to calculate a second average signal strength of second plurality of beacons based on the measured signal strength of each of the second plurality of beacons, and the transmitter may be configured to transmit the signal including the first average signal strength and the second average signal strength, wherein the first average signal strength is provided as the first signal strength value, and the second average signal strength is provided as the second signal strength value.

Each of the first plurality of beacons may include a first origin identifier corresponding to the first beacon origin, each of the second plurality of beacons may include a second origin identifier corresponding to the second beacon origin, and the transmitter may be configured to transmit the signal including the first origin identifier, the first signal strength value mapped to the first origin identifier, the second origin identifier, and the second signal strength value mapped to the second origin identifier.

The first plurality of beacons may be received periodically on a one-by-one basis, the microcontroller unit may be configured to calculate a first average signal strength of one or more of the first plurality of beacons based on the measured signal strength of one or more of the first plurality of beacons, and the transmitter may be configured to transmit the signal, wherein the first average signal strength is provided as the first signal strength value, the transmitter is further configured to: transmit the signal periodically in response to each instance one of the first plurality of beacons is received by the receiver, the first average signal strength being calculated based on a number of the first plurality of beacons thus far received; delay transmission of the signal until a time period lapses, and then transmit the signal including the first average signal strength calculated based on all of the first plurality of beacons received during the time period; or delay transmission of the signal until all of the first plurality of beacons have been received by the receiver, and then transmit the signal including the first average signal strength calculated based on all of the first plurality of beacons.

The TPMS sensor module may further include an acceleration sensor configured to detect whether the TPMS sensor module is in motion, and the microcontroller unit may be configured to disable the receiver while the TPMS sensor module is not in motion, and to enable the receiver at periodic intervals while the TPMS sensor module is in motion. For example, the application of the TPMS module can distinguish between driving and parking by using a means of motion detection either integrated in the TPMS IC or connected to it. For example, the means of motion detection may be an acceleration sensor configured to detect radial acceleration that occurs upon rotation of the wheel, or a magnetic sensor configured to detect a change in a measured magnetic field, such as the Earth's magnetic field, indicative of a rotation of the tire.

The TPMS sensor module may further include an acceleration sensor configured to detect whether the TPMS sensor module is in motion, and the microcontroller unit may be configured to reduce an activity of the receiver while the TPMS sensor is not in motion, and to increase the activity of the receiver while the TPMS sensor is in motion. For example, the application of the TPMS module can distinguish between driving and parking by using a means of motion detection either integrated in the TPMS IC or connected to it. For example, the means of motion detection may be an acceleration sensor configured to detect radial acceleration that occurs upon rotation of the wheel, or a magnetic sensor configured to detect a change in a measured magnetic field, such as the Earth's magnetic field, indicative of a rotation of the tire.

The signal further may further include tire pressure information corresponding to the measured internal air pressure.

The receiver may be configured to receive a request to provide tire pressure information in response to the transmitter transmitting the signal, and the transmitter may be configured to transmit the tire pressure information based on the measured internal air pressure.

A TPMS may include a plurality of beacon transmitters each provided at a different location and each configured to transmit a plurality of beacons; a first TPMS sensor module configured to receive the plurality of beacons from each of the plurality of beacon transmitters, measure a signal strength of each of the plurality of beacons from each of the plurality of beacon transmitters, and transmit a signal including a first signal strength value for each of the plurality of beacon transmitters, each first signal strength value being representative of the measured signal strength of one or more of the plurality of beacons from a corresponding beacon transmitter of the plurality of beacon transmitters; and a control unit configured to receive the signal and determine a location of the first TPMS sensor module based on the first signal strength value for each of the plurality of beacon transmitters.

The first TPMS sensor module may be configured to calculate a first average signal strength for each of the plurality of beacon transmitters based on the measured signal strength of each of the plurality of beacons from each of the plurality of beacon transmitters, where the first average signal strength for each of the plurality of beacon transmitters is provided as the first signal strength value for each of the plurality of beacon transmitters; and the control unit may be configured to receive the signal and determine the location of the first TPMS sensor module based on the first average signal strength for each of the plurality of beacon transmitters.

Instead of packaging signal strength values for each of the plurality of beacon transmitters into a single signal, separate signals may also be transmitted for each of the plurality of beacon transmitters with their corresponding signal strength value.

The control unit may be configured with location information for each of the plurality of beacon transmitters, and may be configured to determine the location of the first TPMS sensor module based on the first signal strength value for each of the plurality of beacon transmitters and the location information for each of the plurality of beacon transmitters.

Each of the plurality of beacons from each of the plurality of beacon transmitters may include a beacon identifier identifying a corresponding beacon transmitter of the plurality of beacon transmitters, the first TPMS sensor module may be configured to transmit the signal including the first signal strength value for each of the plurality of beacon transmitters and further including the beacon identifier for each of the plurality of beacon transmitters, each beacon identifier being mapped to the first signal strength value of the corresponding beacon transmitter, and the control unit may be configured determine the location of the first TPMS sensor module based on the first signal strength value and the beacon identifier for each of the plurality of beacon transmitters.

The first TPMS sensor module may have a TPMS identifier, the first TPMS sensor module may be configured to transmit the signal including the first signal strength value for each of the plurality of beacon transmitters and further including the TPMS identifier, and the control unit may be configured associate the determined location of the first TPMS sensor module with the TPMS identifier.

The plurality of beacon transmitters may be Bluetooth low energy (BLE) beacon transmitters, and the plurality of beacons from each of the plurality of beacon transmitters may be BLE beacons.

The TPMS may further include a second TPMS sensor module configured to receive the plurality of beacons from each of the plurality of beacon transmitters, measure the signal strength of each of the plurality of beacons from each of the plurality of beacon transmitters, and transmit another signal including a second signal strength value for each of the plurality of beacon transmitters, each second signal strength value being representative of the measured signal strength of one or more of the plurality of beacons from a corresponding beacon transmitter of the plurality of beacon transmitters, and the control unit may be configured to receive the signal from the first TPMS sensor module and the other signal from the second TPMS sensor module, determine the location of the first TPMS sensor module based on the first signal strength value for each of the plurality of beacon transmitters transmitted by the first TPMS sensor module, and determine the location of the second TPMS sensor module based on the second signal strength value for each of the plurality of beacon transmitters transmitted by the second TPMS sensor module.

The control unit may be configured to determine the location of the first TPMS sensor module based on the first signal strength value for each of the plurality of beacon transmitters transmitted by the first TPMS sensor module and based on the second signal strength value for each of the plurality of beacon transmitters transmitted by the second TPMS sensor module.

The control unit may be configured to determine the location of the second TPMS sensor module based on the first signal strength value for each of the plurality of beacon transmitters transmitted by the first TPMS sensor module and based on the second signal strength value for each of the plurality of beacon transmitters transmitted by the second TPMS sensor module.

The first TPMS sensor module may be configured to calculate a first average signal strength for each of the plurality of beacon transmitters based on the measured signal strength of each of the plurality of beacons from each of the plurality of beacon transmitters, wherein the first average signal strength for each of the plurality of beacon transmitters is provided as the first signal strength value for each of the plurality of beacon transmitters, the second TPMS sensor module may be configured to calculate a second average signal strength for each of the plurality of beacon transmitters based on the measured signal strength of each of the plurality of beacons from each of the plurality of beacon transmitters, where the second average signal strength for each of the plurality of beacon transmitters is provided as the second signal strength value for each of the plurality of beacon transmitters, and the control unit may be configured to receive the signal from the first TPMS sensor module and the other signal from the second TPMS sensor module, determine the location of the first TPMS sensor module based on the first average signal strength for each of the plurality of beacon transmitters transmitted by the first TPMS sensor module, and determine the location of the second TPMS sensor module based on the second average signal strength for each of the plurality of beacon transmitters transmitted by the second TPMS sensor module.

The control unit may be configured to determine the location of the first TPMS sensor module based on the first average signal strength for each of the plurality of beacon transmitters transmitted by the first TPMS sensor module and based on the second average signal strength for each of the plurality of beacon transmitters transmitted by the second TPMS sensor module.

The control unit may be configured to determine the location of the second TPMS sensor module based on the first average signal strength for each of the plurality of beacon transmitters transmitted by the first TPMS sensor module and based on the second average signal strength for each of the plurality of beacon transmitters transmitted by the second TPMS sensor module.

The control unit may be configured with location information for each of the plurality of beacon transmitters, and the control unit may be configured to determine the location of the first TPMS sensor module based the location information for each of the plurality of beacon transmitters, and determine the location of the second TPMS sensor module based the location information for each of the plurality of beacon transmitters.

Each of the plurality of beacons from each of the plurality of beacon transmitters may include a beacon identifier identifying a corresponding beacon transmitter of the plurality of beacon transmitters; the first TPMS sensor module may be configured to transmit the signal including the first average signal strength for each of the plurality of beacon transmitters and further including the beacon identifier for each of the plurality of beacon transmitters, each beacon identifier being mapped to the first average signal strength of the corresponding beacon transmitter; the second TPMS sensor module may be configured to transmit the other signal including the second average signal strength for each of the plurality of beacon transmitters calculated thereby and further including the beacon identifier for each of the plurality of beacon transmitters, each beacon identifier being mapped to the second average signal strength of the corresponding beacon transmitter; and the control unit may be configured determine the location of the first TPMS sensor module based on the first average signal strength and the beacon identifier for each of the plurality of beacon transmitters received in the signal, and determine the location of the second TPMS sensor module based on the second average signal strength and the beacon identifier for each of the plurality of beacon transmitters received in the other signal.

The first TPMS sensor module may be configured to detect whether the first TPMS sensor module is in motion, disable a receiver while the first TPMS sensor module is not in motion, and to enable the receiver at periodic intervals while the first TPMS sensor module is in motion.

The first TPMS sensor module may be configured to detect whether the first TPMS sensor module is in motion, reduce an activity of a receiver while the first TPMS sensor module is not in motion, and to increase the activity of the receiver while the first TPMS sensor module is in motion.

A TPMS sensor module may include a pressure sensor configured to measure an internal air pressure of a tire; a receiver configured to receive a first plurality of beacons from a first beacon origin and measure a signal strength of each of the first plurality of beacons; a microcontroller unit electrically connected to the receiver and configured to calculate a first average signal strength of first plurality of beacons based on the measured signal strength of each of the first plurality of beacons; and a transmitter electrically connected to the microcontroller unit and configured to transmit a signal including the first average signal strength.

A TPMS may include a plurality of beacon transmitters each provided at a different location and each configured to transmit a plurality of beacons; a first TPMS sensor module configured to receive the plurality of beacons from each of the plurality of beacon transmitters, measure a signal strength of each of the plurality of beacons from each of the plurality of beacon transmitters, calculate an average signal strength for each of the plurality of beacon transmitters based on the measured signal strength of each of the plurality of beacons from each of the plurality of beacon transmitters, and transmit a signal including the average signal strength for each of the plurality of beacon transmitters; and a control unit configured to receive the signal and determine a location of the first TPMS sensor module based on the average signal strength for each of the plurality of beacon transmitters.

While various embodiments have been described, it will be apparent to those of ordinary skill in the art that many more embodiments and implementations are possible within the scope of the disclosure. Accordingly, the invention is not to be restricted except in light of the attached claims and their equivalents. With regard to the various functions performed by the components or structures described above (assemblies, devices, circuits, systems, etc.), the terms (including a reference to a "means") used to describe such components are intended to correspond, unless otherwise indicated, to any component or structure that performs the specified function of the described component (i.e., that is functionally equivalent), even if not structurally equivalent to the disclosed structure that performs the function in the exemplary implementations of the invention illustrated herein.

Furthermore, the following claims are hereby incorporated into the detailed description, where each claim may stand on its own as a separate example embodiment. While each claim may stand on its own as a separate example embodiment, it is to be noted that—although a dependent claim may refer in the claims to a specific combination with one or more other claims—other example embodiments may also include a combination of the dependent claim with the subject matter of each other dependent or independent claim. Such combinations are proposed herein unless it is stated that a specific combination is not intended. Furthermore, it is intended to include also features of a claim to any other independent claim even if this claim is not directly made dependent to the independent claim.

It is further to be noted that methods disclosed in the specification or in the claims may be implemented by a device having means for performing each of the respective acts of these methods, and vice versa where a function or sting of functions described in context of implemented one or more devices may be performed as a method.

Further, it is to be understood that the disclosure of multiple acts or functions disclosed in the specification or claims may not be construed as to be within the specific order. Therefore, the disclosure of multiple acts or functions will not limit these to a particular order unless such acts or functions are not interchangeable for technical reasons. Furthermore, in some embodiments a single act may include or may be broken into multiple sub acts. Such sub acts may be included and part of the disclosure of this single act unless explicitly excluded.

The techniques described in this disclosure may be implemented, at least in part, in hardware, software, firmware, or any combination thereof. For example, various aspects of the described techniques may be implemented within one or more processors, including one or more microprocessors, digital signal processors (DSPs), application specific integrated circuits (ASICs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure. Such hardware, software, and firmware may be implemented within the same device or within separate devices to support the various techniques described in this disclosure.

Although various exemplary embodiments have been disclosed, it will be apparent to those skilled in the art that various changes and modifications can be made which will achieve some of the advantages of the concepts disclosed herein without departing from the spirit and scope of the invention. It will be obvious to those reasonably skilled in the art that other components performing the same functions may be suitably substituted. It is to be understood that other embodiments may be utilized and structural or logical changes may be made without departing from the scope of the present invention. It should be mentioned that features explained with reference to a specific figure may be combined with features of other figures, even in those not explicitly mentioned. Such modifications to the general inventive concept are intended to be covered by the appended claims and their legal equivalents.

What is claimed is:

1. A tire pressure monitoring system (TPMS) sensor module, comprising:
   a pressure sensor configured to measure an internal air pressure of a tire;
   a receiver configured to receive a first plurality of beacons from a first beacon origin and measure a signal strength of each of the first plurality of beacons;
   a microcontroller unit electrically connected to the receiver; and
   a transmitter electrically connected to the microcontroller unit and configured to transmit a signal including a first signal strength value representative of the measured signal strength of one or more of the first plurality of beacons,
   wherein:
   the first plurality of beacons are received periodically on a one-by-one basis,
   the microcontroller unit is configured to calculate a first average signal strength of one or more of the first plurality of beacons based on the measured signal strength of one or more of the first plurality of beacons, and
   the transmitter is configured to transmit the signal, wherein the first average signal strength is provided as the first signal strength value, the transmitter is further configured to:
      transmit the signal periodically in response to each instance one of the first plurality of beacons is received by the receiver, the first average signal strength being calculated based on a number of the first plurality of beacons thus far received,
      delay transmission of the signal until a time period lapses, and then transmit the signal including the first average signal strength calculated based on all of the first plurality of beacons received during the time period, or
      delay transmission of the signal until all of the first plurality of beacons have been received by the receiver, and then transmit the signal including the first average signal strength calculated based on all of the first plurality of beacons.

2. The TPMS sensor module of claim 1, wherein:
   the microcontroller unit is configured to calculate the first average signal strength of the first plurality of beacons based on the measured signal strength of each of the first plurality of beacons.

3. The TPMS sensor module of claim 1, wherein:
   each of the first plurality of beacons includes a first origin identifier corresponding to the first beacon origin, and
   the transmitter is configured to transmit the signal including the first origin identifier and the first signal strength value.

4. The TPMS sensor module of claim 3, wherein the TPMS sensor has a TPMS identifier, and the transmitter is configured to transmit the TPMS identifier in the signal.

5. The TPMS sensor module of claim 1, wherein the receiver and the transmitter are integrated in a Bluetooth transceiver, and the first plurality of beacons are Bluetooth low energy (BLE) beacons.

6. A tire pressure monitoring system (TPMS) sensor module, comprising:
   a pressure sensor configured to measure an internal air pressure of a tire;
   a receiver configured to receive a first plurality of beacons from a first beacon origin and measure a signal strength of each of the first plurality of beacons;
   a microcontroller unit electrically connected to the receiver; and
   a transmitter electrically connected to the microcontroller unit and configured to transmit a signal including a first signal strength value representative of the measured signal strength of one or more of the first plurality of beacons,
   wherein the receiver is configured to receive a second plurality of beacons from a second beacon origin and measure a signal strength of each of the second plurality of beacons, and
   wherein the transmitter is configured to transmit the signal including the first signal strength value and a second signal strength value representative of the measured signal strength of one or more of the second plurality of beacons.

7. The TPMS sensor module of claim 6, wherein:
   the microcontroller unit is configured to calculate a first average signal strength of the first plurality of beacons based on the measured signal strength of each of the first plurality of beacons,
   the microcontroller unit is configured to calculate a second average signal strength of second plurality of beacons based on the measured signal strength of each of the second plurality of beacons, and
   the transmitter is configured to transmit the signal including the first average signal strength and the second average signal strength, wherein the first average signal strength is provided as the first signal strength value, and the second average signal strength is provided as the second signal strength value.

8. The TPMS sensor module of claim 6, wherein:
   each of the first plurality of beacons includes a first origin identifier corresponding to the first beacon origin,
   each of the second plurality of beacons includes a second origin identifier corresponding to the second beacon origin, and
   the transmitter is configured to transmit the signal including the first origin identifier, the first signal strength value mapped to the first origin identifier, the second origin identifier, and the second signal strength value mapped to the second origin identifier.

9. A tire pressure monitoring system (TPMS), comprising:
   a plurality of beacon transmitters each provided at a different location and each configured to transmit a plurality of beacons;
   a first TPMS sensor module configured to receive the plurality of beacons from each of the plurality of beacon transmitters, measure a signal strength of each of the plurality of beacons from each of the plurality of beacon transmitters, and transmit a signal including a first signal strength value for each of the plurality of beacon transmitters, each first signal strength value being representative of the measured signal strength of one or more of the plurality of beacons from a corresponding beacon transmitter of the plurality of beacon transmitters; and
   a control unit configured to receive the signal and determine a location of the first TPMS sensor module based on the first signal strength value for each of the plurality of beacon transmitters.

10. The TPMS of claim 9, wherein:
    the first TPMS sensor module configured to calculate a first average signal strength for each of the plurality of beacon transmitters based on the measured signal strength of each of the plurality of beacons from each of the plurality of beacon transmitters, wherein the first average signal strength for each of the plurality of beacon transmitters is provided as the first signal strength value for each of the plurality of beacon transmitters; and the control unit is configured to receive the signal and determine the location of the first TPMS sensor module based on the first average signal strength for each of the plurality of beacon transmitters.

11. The TPMS of claim 9, wherein the control unit is configured with location information for each of the plurality of beacon transmitters, and is configured to determine the location of the first TPMS sensor module based on the first signal strength value for each of the plurality of beacon transmitters and the location information for each of the plurality of beacon transmitters.

12. The TPMS of claim 9, wherein:
each of the plurality of beacons from each of the plurality of beacon transmitters include a beacon identifier identifying a corresponding beacon transmitter of the plurality of beacon transmitters,
the first TPMS sensor module is configured to transmit the signal including the first signal strength value for each of the plurality of beacon transmitters and further including the beacon identifier for each of the plurality of beacon transmitters, each beacon identifier being mapped to the first signal strength value of the corresponding beacon transmitter, and
the control unit is configured determine the location of the first TPMS sensor module based on the first signal strength value and the beacon identifier for each of the plurality of beacon transmitters.

13. The TPMS of claim 9, wherein the first TPMS sensor module has a TPMS identifier,
the first TPMS sensor module is configured to transmit the signal including the first signal strength value for each of the plurality of beacon transmitters and further including the TPMS identifier, and
the control unit is configured associate the determined location of the first TPMS sensor module with the TPMS identifier.

14. The TPMS of claim 9, wherein the plurality of beacon transmitters are Bluetooth low energy (BLE) beacon transmitters, and the plurality of beacons from each of the plurality of beacon transmitters are BLE beacons.

15. The TPMS of claim 9, further comprising:
a second TPMS sensor module configured to receive the plurality of beacons from each of the plurality of beacon transmitters, measure the signal strength of each of the plurality of beacons from each of the plurality of beacon transmitters, and transmit another signal including a second signal strength value for each of the plurality of beacon transmitters, each second signal strength value being representative of the measured signal strength of one or more of the plurality of beacons from a corresponding beacon transmitter of the plurality of beacon transmitters,
wherein the control unit configured to receive the signal from the first TPMS sensor module and the other signal from the second TPMS sensor module, determine the location of the first TPMS sensor module based on the first signal strength value for each of the plurality of beacon transmitters transmitted by the first TPMS sensor module, and determine the location of the second TPMS sensor module based on the second signal strength value for each of the plurality of beacon transmitters transmitted by the second TPMS sensor module.

16. The TPMS of claim 15, wherein:
the control unit is configured to determine the location of the first TPMS sensor module based on the first signal strength value for each of the plurality of beacon transmitters transmitted by the first TPMS sensor module and based on the second signal strength value for each of the plurality of beacon transmitters transmitted by the second TPMS sensor module.

17. The TPMS of claim 15, wherein:
the control unit is configured with location information for each of the plurality of beacon transmitters, and the control unit is configured to determine the location of the first TPMS sensor module based the location information for each of the plurality of beacon transmitters, and determine the location of the second TPMS sensor module based the location information for each of the plurality of beacon transmitters.

18. The TPMS of claim 15, wherein:
the first TPMS sensor module is configured to calculate a first average signal strength for each of the plurality of beacon transmitters based on the measured signal strength of each of the plurality of beacons from each of the plurality of beacon transmitters, wherein the first average signal strength for each of the plurality of beacon transmitters is provided as the first signal strength value for each of the plurality of beacon transmitters,
the second TPMS sensor module is configured to calculate a second average signal strength for each of the plurality of beacon transmitters based on the measured signal strength of each of the plurality of beacons from each of the plurality of beacon transmitters, wherein the second average signal strength for each of the plurality of beacon transmitters is provided as the second signal strength value for each of the plurality of beacon transmitters, and
the control unit is configured to receive the signal from the first TPMS sensor module and the other signal from the second TPMS sensor module, determine the location of the first TPMS sensor module based on the first average signal strength for each of the plurality of beacon transmitters transmitted by the first TPMS sensor module, and determine the location of the second TPMS sensor module based on the second average signal strength for each of the plurality of beacon transmitters transmitted by the second TPMS sensor module.

19. The TPMS of claim 18, wherein each of the plurality of beacons from each of the plurality of beacon transmitters include a beacon identifier identifying a corresponding beacon transmitter of the plurality of beacon transmitters,
the first TPMS sensor module is configured to transmit the signal including the first average signal strength for each of the plurality of beacon transmitters and further including the beacon identifier for each of the plurality of beacon transmitters, each beacon identifier being mapped to the first average signal strength of the corresponding beacon transmitter,
the second TPMS sensor module is configured to transmit the other signal including the second average signal strength for each of the plurality of beacon transmitters calculated thereby and further including the beacon identifier for each of the plurality of beacon transmitters, each beacon identifier being mapped to the second average signal strength of the corresponding beacon transmitter, and
the control unit is configured determine the location of the first TPMS sensor module based on the first average signal strength and the beacon identifier for each of the plurality of beacon transmitters received in the signal, and determine the location of the second TPMS sensor module based on the second average signal strength and the beacon identifier for each of the plurality of beacon transmitters received in the other signal.

* * * * *